(12) United States Patent
Ninose et al.

(10) Patent No.: US 8,762,768 B2
(45) Date of Patent: *Jun. 24, 2014

(54) STORAGE SYSTEM FOR RESTORING DATA STORED IN FAILED STORAGE DEVICE

(71) Applicant: Hitachi, Ltd., Tokyo (JP)

(72) Inventors: Kenta Ninose, Yokohama (JP); Tomohiro Kawaguchi, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,440

(22) Filed: Aug. 9, 2013

(65) Prior Publication Data

US 2013/0326139 A1 Dec. 5, 2013

Related U.S. Application Data

(63) Continuation of application No. 13/035,950, filed on Feb. 26, 2011, now Pat. No. 8,522,071, which is a continuation of application No. 12/128,974, filed on May 29, 2008, now Pat. No. 7,917,805.

(30) Foreign Application Priority Data

Nov. 9, 2007 (JP) ................................. 2007-291808

(51) Int. Cl.
*G06F 11/00* (2006.01)
(52) U.S. Cl.
USPC ........................................................ 714/6.1
(58) Field of Classification Search
CPC ............ G06F 11/1076; G06F 11/1084; G06F 11/1088
USPC ........................................................ 714/6.1
See application file for complete search history.

(56) References Cited

U.S. PATENT DOCUMENTS

| 6,912,614 | B2 | 6/2005 | Tomita |
| 7,152,078 | B2 | 12/2006 | Yamagami |
| 7,565,503 | B2 | 7/2009 | Fujibayashi |
| 7,594,137 | B2 | 9/2009 | Kawaguchi et al. |
| 8,010,837 | B2 | 8/2011 | Kawaguchi et al. |
| 2002/0133669 | A1 | 9/2002 | Devireddy et al. |
| 2006/0107017 | A1 | 5/2006 | Serizawa et al. |

(Continued)

FOREIGN PATENT DOCUMENTS

| JP | 05-081103 | 4/1993 |
| JP | 2003-167690 | 6/2003 |

(Continued)

*Primary Examiner* — Bryce Bonzo
(74) *Attorney, Agent, or Firm* — Antonelli, Terry, Stout & Kraus, LLP.

(57) ABSTRACT

A storage system including: a controller; and, a plurality of physical storage devices coupled to the controller and constituting a RAID group; wherein the controller provides one or more logical volumes belonging to the RAID group, each of the one or more logical volumes having a plurality of storage areas; and one or more virtual volumes, wherein, when receiving a write request to a virtual volume of the one or more virtual volumes, the controller is configured to: allocate a storage area in a logical volume to the virtual volume, as an allocated storage area, where reliability of the storage area is used as a criterion in a selection of the storage area for allocation to the virtual volume; and write data to the allocated storage area, wherein, the controller is configured to selectively perform a RAID allocation process to a storage area allocated to a virtual volume.

6 Claims, 9 Drawing Sheets

(56) References Cited

U.S. PATENT DOCUMENTS

| | | |
|---|---|---|
| 2006/0112302 A1 | 5/2006 | Cherian |
| 2008/0104346 A1 | 5/2008 | Watanabe et al. |
| 2008/0104347 A1 | 5/2008 | Iwamura et al. |
| 2008/0104443 A1 | 5/2008 | Akutsu et al. |
| 2008/0109601 A1 | 5/2008 | Klemm et al. |
| 2008/0189700 A1 | 8/2008 | Schmidt et al. |
| 2010/0199040 A1 | 8/2010 | Schnapp et al. |

FOREIGN PATENT DOCUMENTS

| | | |
|---|---|---|
| JP | 2003-233518 | 8/2003 |
| JP | 2005-11316 | 1/2005 |
| JP | 2007-199922 | 8/2007 |

FIG. 5

| LOGICAL VOLUME ID | LBA |
|---|---|
| NULL | NULL |
| #0001 | 0x10001000 |
| #FFBA | 0x12345678 |
| NULL | NULL |

FIG. 6

| LOGICAL VOLUME ID | POINTER TO STORAGE AREA MANAGEMENT TABLE |
|---|---|
| #0001 | 0xAB8F FF00 |
| #FFBA | 0x0011 5800 |
| #0020 | 0x808F2240 |

FIG. 7

| VIRTUAL VOLUME ID | LBA |
|---|---|
| NULL | NULL |
| NULL | NULL |
| #8001 | 0x00001000 |
| NULL | NULL |

| LOGICAL VOLUME ID | LBA | RESTORE STATUS |
|---|---|---|
| NULL | NULL | NULL |
| #0001 | 0x10001000 | 1 |
| #FFBA | 0x12345678 | 0 |
| NULL | NULL | NULL |

STORAGE SYSTEM FOR RESTORING DATA STORED IN FAILED STORAGE DEVICE

CROSS REFERENCE TO RELATED APPLICATION

This is a continuation of U.S. application Ser. No. 13/035,950, filed Feb. 26, 2011, which is a continuation of U.S. application Ser. No. 12/128,974, filed May 29, 2008. This application relates to and claims priority from Japanese Patent Application No. 2007-291808, filed on Nov. 9, 2007. The entirety of the contents and subject matter of all of the above is incorporated herein by reference.

BACKGROUND

The present invention generally relates to technology for restoring data in a storage system.

RAID (Redundant Array of Independent Disks) technology is generally used to enhance storage system reliability. According to this technology, a logical storage device (hereinafter, logical volume) is constituted from a plurality of physical storage devices (hereinafter, physical devices, for example, hard disk drives or flash memories). Consequently, storage system reliability is enhanced. The logical volume is provided from the storage system to a host computer as the target of an I/O request (a data read or write).

There are a number of levels of RAID. For example, there is RAID 1. In RAID 1, for example, one logical volume is constituted by two physical devices of the same capacity, and data written from the host computer is written to the two physical devices. In this case, should either one of the physical devices fail, the data can be acquired from the remaining physical device. The reliability of the storage system is thereby enhanced. Further, replacing the failed physical device, and copying the data from the remaining physical device to the post-replacement physical device restores the data to the redundant state, once again achieving a heightened state of reliability. Thus, hereinafter, the process for writing the data that was stored in the failed physical device to the post-replacement physical device subsequent to replacing the failed physical device will be called the "RAID restore process".

In addition to RAID 1, there are other RAID levels, such as RAID 5, which use parity to prevent data loss. When one physical device fails, these technologies also enhance storage system reliability by making it possible to determine the data that was stored in the failed physical device via computations that make use of the data and parity stored in the remaining physical devices. Further, replacing the failed physical device, restoring the data that was stored in the failed physical device from the data and parity stored in the remaining physical devices, and storing the restored data in the post-replacement physical device, once again realizes a state of heightened reliability the same as in RAID 1. In RAID 5 and so forth, the data restored using parity is written to the post-replacement physical device, and this process becomes the "RAID restore process" mentioned above.

Other technologies for heightening storage system reliability include a technique that utilizes remote copying (for example, Japanese Patent Laid-open No. 2003-233518). Remote copying is a technique for redundantly storing data in two storage systems. First, for example, logical volumes of the same capacity are created in the two storage systems. Next, the two storage systems are interconnected (for example, by establishing a logical path), and the two created logical volumes are defined as a remote copy pair. The two logical volumes defined as a remote copy pair constitute a state in which the one side is called the primary volume, and the other side is called the secondary volume. The host normally issues an I/O request to the primary volume. When data is written to the primary volume, the storage system, which maintains the primary volume, stores the write-targeted data received from the host in the primary volume, and at the same time writes this data to the secondary volume. In this case, even if the storage system maintaining the primary volume fails, the host can continue the task at hand by accessing the secondary volume instead of the primary volume, and using the updated data in the secondary volume.

Further, a technique other than remote copying is one called the "dynamic capacity allocation function" disclosed in Japanese Patent Laid-open No. 2005-011316. This technique is constituted from a "capacity pool", which brings together the storage areas of the storage system, and a "virtual volume", which does not have a physical storage area.

The "capacity pool" is a storage area constituted by two or more logical volumes from among a plurality of logical volumes maintained by the storage system, and is used for storing write-targeted data from the host. By contrast, the "virtual volume" is an I/O request target, which is provided to the host from the storage system in place of a logical volume, and which does not have a physical storage area. In the dynamic capacity allocation function, a storage area is not allocated to the virtual volume initially. Triggered by a data write to the virtual volume from the host, the storage area for holding the write-data is acquired from a logical volume selected from within the capacity pool, and this storage area is allocated to the data write location of the virtual volume specified in the I/O request from the host (the data write location of the virtual volume and the storage area of the logical volume are made correspondent to one another (so-called mapping is carried out)). The write-targeted data is stored in the storage area acquired from the logical volume. Performing this kind of control makes it possible to enhance data storage efficiency since the storage area allocated from the capacity pool is only the area of the virtual volume capacity into which the data is actually written. The reliability of the logical volume utilized as the capacity pool can also be enhanced by using RAID technology.

As described above, utilizing RAID technology makes it possible for the storage system to receive host I/O even when one of a plurality of physical devices constituting a logical volume fails, and furthermore, a RAID restore process makes it possible to return to a high state of reliability by replacing the failed physical device and writing the data that was stored in this physical device to the post-replacement physical device.

However, the following problems exist in the RAID restore process employed by RAID technology. To make it easier to understand the explanation, RAID 1, that is, one logical volume constituted by two physical devices, will be considered below.

When one physical device fails, the storage system uses the remaining one physical device to process a host-issued I/O request to the logical volume. When the failed physical device is replaced, the storage system, in addition to processing the I/O request issued from the host, copies all of the data from the remaining one physical device to the replaced new physical device, thus returning to the redundant state. Since the storage system is not in a redundant state until the data-copy to the new physical device is complete, the state of reliability is low. The storage capacity of physical devices has increased greatly in recent years, and the time required for a RAID restore process has increased pursuant thereto. Therefore, the problem is that a low state of reliability continues for a long time when a physical device fails even when RAID technology is used.

SUMMARY

An object of the present invention is to shorten as much as possible the time period during which a state of low reliability exists as a result of the failure of a physical storage device.

Other objects of the present invention should become clear from the following explanation.

A storage system controller (for example, an apparatus built into the storage system, or an apparatus, such as a server or a switch, which exists external to the storage system) has a dynamic capacity allocation function. More specifically, the storage system comprises a plurality of RAID groups constituted from a plurality of physical storage devices, and a plurality of real areas constituting a capacity pool created on the basis of the storage areas of the above-mentioned plurality of RAID groups.

In this case, the controller maintains mapping information denoting which real areas are allocated to which virtual areas, and real area management information denoting which real areas are allocated to which virtual areas. The controller receives a write request from a computer, allocates a real area in the capacity pool to a virtual area in the virtual volume specified by this write request, writes the data conforming to this write request to the allocated real area, and associates, in the mapping information and real area management information, information denoting the virtual area, which is the real area allocation destination, with information denoting this allocated real area correspondent. The controller references the real area management information to determine whether or not a low-reliability real area, which is a real area for which reliability has been lowered by the occurrence of a failure in a certain physical storage device, and which belongs to the RAID group comprising this certain physical storage device, has been allocated to a virtual area, and does not carry out a data restore process for a low-reliability real area that has not been allocated to a virtual area, but does carry out a data restore for a low-reliability real area that has been allocated to a virtual area.

BRIEF DESCRIPTION OF THE DRAWINGS

FIG. 5 shows an example of the constitution of a mapping table of the first embodiment;

FIG. 6 shows an example of the constitution of a capacity pool management table of the first embodiment;

FIG. 7 shows an example of the constitution of a storage area management table of the first embodiment;

FIG. 10 shows an example of the constitution of a mapping table of a primary storage system of the second embodiment;

DETAILED DESCRIPTION OF THE PREFERRED EMBODIMENT

Figure 1:
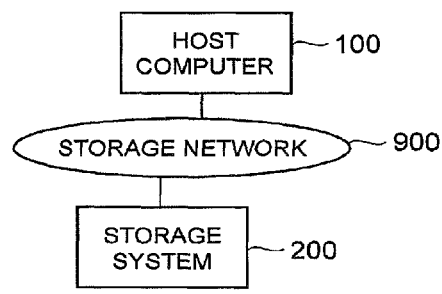
FIG. 1 shows an example of the constitution of a computer system related to a first embodiment of the present invention.

In Embodiment 1, the storage system comprises a plurality of RAID groups constituted by a plurality of physical storage devices; and a plurality of real areas constituting a capacity pool created on the basis of the storage areas of the above-mentioned plurality of RAID groups. A controller, which the storage system comprises (or a controller, which exists outside the storage system, and is connected to the storage system), provides a computer with a virtual volume constituted by a plurality of virtual areas. The controller comprises mapping information, which denotes which real areas are allocated to which virtual areas; real area management information, which denotes which real areas are allocated to which virtual areas; an input/output controller; and a restore controller. The input/output controller receives a write request from the computer, and allocates a real area of the above-mentioned capacity pool to a virtual area of the virtual volume specified by this write request. Further, the input/output controller writes data conforming to this write request to the allocated real area, and associates, in the mapping information and real area management information, information denoting the virtual area of the real area allocation destination with information denoting this allocated real area. The restore controller references the real area management information to determine whether or not a low-reliability real area, which is a real area for which reliability has been lowered by the occurrence of a failure in a certain physical storage device, and which belongs to the RAID group comprising this certain physical storage device, has been allocated to a virtual area. The restore controller does not carry out a data restore process for a low-reliability real area that has not been allocated to a virtual area, but does carry out a data restore for a low-reliability real area that has been allocated to a virtual area.

In Embodiment 2 according to Embodiment 1, in a restore process, the restore controller reads data required to restore the restore-targeted data in the certain physical storage device from among a data group stored in the other physical storage device in the RAID group to which the certain physical storage device belongs, and uses this read data to restore the restore-targeted data in the other physical storage device instead of the certain physical storage device. The restore-targeted data is data, which corresponds to the low-reliability real area allocated to the virtual area, and which is stored in a storage area of the certain physical storage device.

In Embodiment 3 according to Embodiment 2, the storage area in the certain physical storage device and the restore-destination storage area of the above-mentioned restore-targeted data in the other physical storage device correspond to the same real area that has been allocated to the virtual area. That is, there is no need to change the correspondence.

In Embodiment 4 according to any of Embodiments 1 through 3, the storage system is a primary storage system, and is connected to a secondary storage system. The controller further comprises a copy controller for controlling a synchronous remote copy between a primary virtual volume and a secondary virtual volume. The primary virtual volume is a virtual volume constituted by a plurality of primary virtual areas. The secondary virtual volume is in the secondary storage system, and is a virtual volume constituted by a plurality of secondary virtual areas respectively corresponding to the plurality of primary virtual areas. The copy controller carries out a virtual area restore process for low-reliability primary virtual areas to which respective low-reliability real areas have been allocated. In a virtual area restore process, the copy controller sends to the secondary storage system a request for data stored in a secondary virtual area, receives data conforming to this request from the secondary storage system, allocates a real area other than the low-reliability real area to the low-reliability primary virtual area, and writes the received data to this other real area.

In Embodiment 5 according to Embodiment 4, the input/output controller receives from the computer an I/O request specifying a primary virtual volume and primary virtual area in the midst of a virtual area restore process. The input/output controller determines whether or not the primary virtual area specified by the received I/O request is a low-reliability primary virtual area, and if the primary virtual area is not a low-reliability primary virtual area, accesses the real area that has been allocated to this specified primary virtual area. Conversely, if the primary virtual area is a low-reliability primary virtual area, the input/output controller sends the secondary storage system an I/O request, which specifies the secondary virtual volume corresponding to this primary virtual volume and the secondary virtual area corresponding to this specified primary virtual area.

Two or more arbitrary embodiments of the above-described Embodiments 1 through 5 can be combined. At least one of the above-mentioned input/output controller, restore controller, and copy controller can be constructed from hardware (for example, a circuit), a computer program or a combination thereof (for example, one part can be realized via a computer program, and the remainder can be realized via hardware). The computer program is executed by being read into a prescribed processor. Further, a storage region that exists in a hardware resource, such as a memory, can be used as needed during information processing, which is carried out by the computer program being read into the processor. Further, the computer program can be installed in a computer from a CD-ROM or other such recording medium, or can be downloaded to a computer via a communication network.

A number of embodiments of the present invention will be explained below by referring to the figures.

Embodiment 1

First, an outline of the first embodiment will be explained.

The first embodiment comprises a host and a storage system connected thereto. The storage system maintains a virtual volume realized by the dynamic capacity allocation function, and the host issues an I/O request to this virtual volume. Further, a storage area acquired from the capacity pool is allocated to one part of the virtual volume, and data written from the host is stored in the allocated storage area. Conversely, data is not written at all from the host to the part of the virtual volume to which the storage area has not been allocated.

The storage system has a mapping table for managing the status of storage area allocation to the virtual volume. The virtual volume is segmented into small areas, but the mapping table shows whether or not a storage area has been allocated from the capacity pool for each small area, and when a storage area has been allocated, shows which storage area inside the capacity pool has been allocated. One mapping table exists for each virtual volume.

Furthermore, the storage system maintains for each capacity pool a capacity pool management table for managing the logical volumes constituting the capacity pool.

Furthermore, the storage system maintains, for each logical volume comprised in the capacity pool, a storage area management table for managing small and not-so-small areas of the storage areas of the logical volumes comprised in the capacity pool, which have already been allocated to the virtual volume.

It is supposed here that a physical device, which constitutes the relevant logical volume in a number of logical volumes of the plurality of logical volumes constituting the capacity pool, fails, and thereafter, the failed physical device is replaced. The storage system returns the logical volume comprised by the replaced physical device to a high state of reliability via the RAID restore process. The storage system at this time references the storage area management table corresponding to the logical volume that the storage system itself selected, and executes the RAID restore process only for the portion of the storage area of the logical volume, which has already been allocated to the virtual volume.

Consequently, the required RAID restore process can be completed in a shorter time than when the RAID restore process is executed for all the areas corresponding to the failed physical device, thereby making it possible to provide a high speed RAID restore process.

FIG. 1 shows an example of the constitution of a computer system related to the first embodiment of the present invention.

One or more host computers 100 are connected to one or more storage systems 200 by way of a storage network 900. The storage network 900, for example, is a SAN (Storage Area Network), but the present invention is not limited to this, and various other types of networks can be used.

Figure 2:
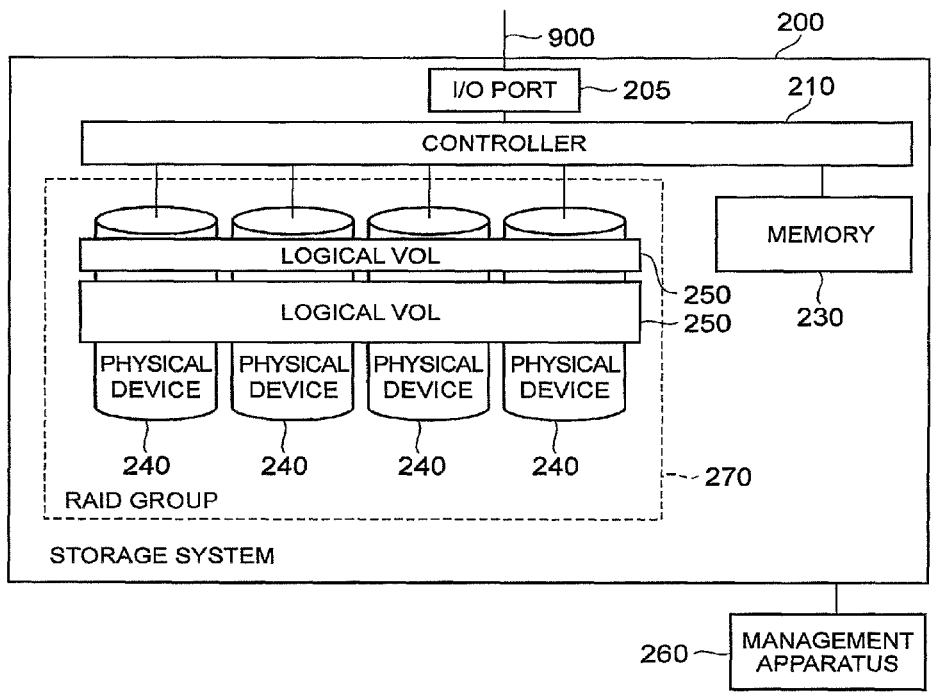
FIG. 2 shows an example of the hardware constitution of a storage system of the first embodiment.

FIG. 2 shows an example of the hardware constitution of the storage system 200 of the first embodiment.

The storage system 200 comprises a controller 210, a memory 230, an I/O port 205, and a plurality of physical devices 240.

The storage system 200 is controlled by the controller 210. The controller 210, for example, is either a microprocessor, or a circuit board comprising a microprocessor.

The memory 230 stores computer programs executed by the controller 210, and the data utilized by these computer programs. Further, a portion of the area of the memory 230 can also be used as a cache for temporarily storing the data written/read to/from the host computer 100.

The I/O port 205 is connected to the storage network 900, and makes it possible for data to be exchanged with the host computer 100 by way of the storage network 900. Either one or a plurality of I/O ports 205 is provided.

The physical devices 240 are physical hardware (storage devices) for storing data sent from the host computer 100, and typically comprise nonvolatile storage devices, such as hard disk drives. In this embodiment, the reliability of the storage system is enhanced by combining a plurality of physical devices 240 into a RAID (Redundant Array of Inexpensive Disks) configuration. Further, a high-reliability storage area comprising a plurality of physical devices 240 made using this kind of RAID technology will be called a RAID group 270. A logical volume 250 is part of the storage area of the RAID group 270. The logical volume 250 is the I/O request destination, which is specified when the host computer 100 issues the I/O request. When the controller 210 receives an I/O request from the host computer 100, the controller 210 accesses the logical volume 250 specified by this I/O request. Accessing the logical volume 250 is equivalent to accessing the plurality of physical devices 240 corresponding to this logical volume 250. In this embodiment, the logical volume 250 is utilized as a member of the capacity pool of the "dynamic capacity allocation function" explained hereinbelow. In other words, the logical volumes 250 belonging to the RAID group 270 include both a logical volume, which is used as a member of the capacity pool, and which is not provided to the host computer 100, as well as an ordinary logical volume, which is provided to the host computer 100. Furthermore, a logical volume, which is treated as a member of the capacity pool, can also be a logical volume with a so-called external connection function (a virtual volume of a different type than the capacity expansion volume explained hereinbelow). This logical volume, for example, is a virtual logical volume created on the basis of the storage area of a virtual RAID group (or, a logical volume, which is correspondent on a one-to-one basis with an external volume explained hereinbelow). The virtual RAID group, for example, is a device constituted by either one or a plurality of logical volumes (hereinafter, an external volume) comprised in either one or a plurality of external storage systems connected to the storage system 200.

A management apparatus 260 is connected to the storage system 200. The management apparatus 260 is an apparatus for maintaining and managing the storage system 200. Further, the management apparatus 260 can also have a function for giving the storage system 200 special indications.

Figure 3:
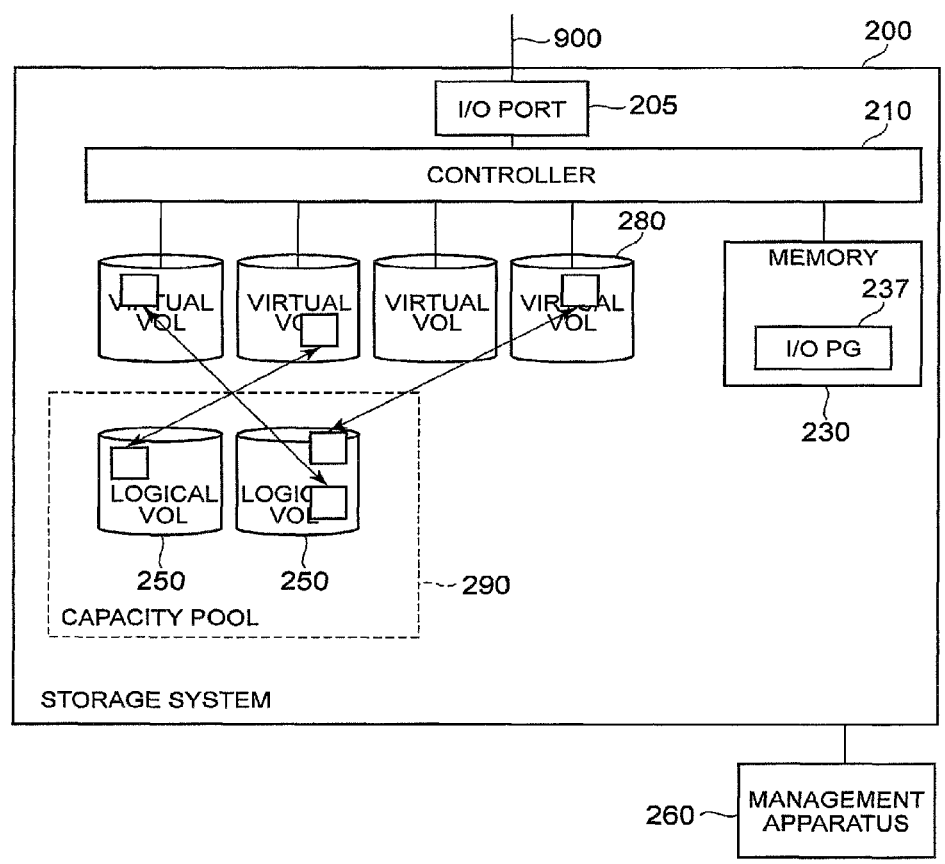
FIG. 3 is a conceptual view of a dynamic capacity allocation function provided by the storage system of the first embodiment.

FIG. 3 is a conceptual view of the dynamic capacity allocation function provided by the storage system 200 in the first embodiment of the present invention.

A virtual volume according to the dynamic capacity allocation function is one that conforms to so-called Thin Provisioning technology. In other words, a virtual volume according to the dynamic capacity allocation function is a capacity expansion volume for which capacity is expanded dynamically. A detailed explanation follows.

The storage system 200 provides a virtual volume 280 instead of the logical volume 250 as the destination of the I/O request specified by the host computer 100. The host computer 100 recognizes the virtual volume 280 in exactly the same way as the logical volume 250, specifies the virtual volume 280, and issues the I/O request.

The virtual volume 280 is the I/O request destination specified when the host computer 100 issues an I/O request. From the perspective of the host computer 100, the virtual volume 280 is seen simply as the capacity portion of a storage area for storing data, exactly the same as the logical volume 250 when viewed from the perspective of the host computer 100. However, in actuality, the virtual volume 280 does not have a storage area for storing data. The virtual volume 280 is constituted from a plurality of virtual storage areas (hereinafter, virtual areas). The controller 210, upon receiving from the host computer 100 a write request specifying a certain virtual area of a certain virtual volume 280, acquires a storage area (hereinafter, real area) of the required amount of capacity from the capacity pool 290, and writes the write-targeted data to this real area.

Thereafter, the acquired real area is made correspondent to the relevant virtual area (this is called mapping) of the virtual volume 280 (the virtual area specified by the write request). Thus, the real area acquired from the capacity pool 290 is mapped only to the virtual area to which the host computer 100 wrote the data in the virtual volume 280.

The capacity pool 290 is a cluster of storage areas for storing data written to the virtual volume 280. In this embodiment, the capacity pool 290 is constituted by bringing together a plurality of logical volumes 250. The logical volumes 250 that belong to the capacity pool 290 are also a part of the RAID group 270 made using RAID technology, and as such, have high reliability. When a real area has yet to be allocated to the virtual area specified by a write request from the host computer 100, the controller 210 selects a logical volume 250 from among the logical volumes 250 comprised in the capacity pool 290, and also selects a real area possessed by this logical volume 250, and maps this real area to this specified virtual area.

To simplify the management of the virtual volume 280 and the logical volumes 250 comprised in the capacity pool 290 like this, a storage area management unit having a fixed size is generally used in the dynamic capacity allocation function. In this embodiment, this storage area management unit will be called a "chunk". That is, both the virtual volume 280 and the logical volumes 250 that are treated as members of the capacity pool 290 are constituted by a plurality of chunks. Hereinafter, a chunk constituting a virtual volume 280 (that is, a virtual area) will be referred to as a "virtual chunk", and a chunk constituting a logical volume 250 (that is, a real area) will be referred to as a "real chunk". The size of a chunk, for example, will be 10 MB (megabytes), but chunk size is not limited to this, and can be made an arbitrary size. All virtual volumes 280 are managed as clusters of virtual chunks. For example, a 100 GB virtual volume 280 is constituted from 10240 virtual chunks. However, since there is no physical storage area allocated to the virtual volume 280, there are also no physical storage areas allocated to the respective virtual chunks constituting the virtual volume 280. By contrast, the respective logical volumes 250 comprised in the capacity pool 290 are managed as clusters of real chunks. The process for allocating a storage area from the capacity pool 290 to the virtual volume 280 is actually realized as one which properly selects, from the logical volumes 250 comprised in the capacity pool 290, either one or a plurality of real chunks to be allocated to either one or a plurality of virtual chunks specified by a write request, and makes this one or a plurality of real chunks correspondent to the above-mentioned specified one or a plurality of virtual chunks. By so doing, the mapping of the storage area from the capacity pool 290 to the virtual volume 280 can be realized as chunk allocations.

Furthermore, the total storage area of all the virtual volumes 280 (the virtual storage area) can be larger than the total storage area of all the logical volumes 250 comprised in the capacity pool 290. Further, the virtual chunk size and the real chunk size can be the same or can differ. For example, the size of the real chunk can be smaller than the size of the virtual chunk. Hereinafter, to make the explanation easier to understand, it will be supposed that the virtual chunk size is the same as the real chunk size. Further, the processing of a write request to the virtual volume 280 from the host computer 100 (for example, the dynamic allocation of a real chunk to a virtual chunk) will be carried out in accordance with an I/O program 237 executed by the controller 210.

Figure 4:
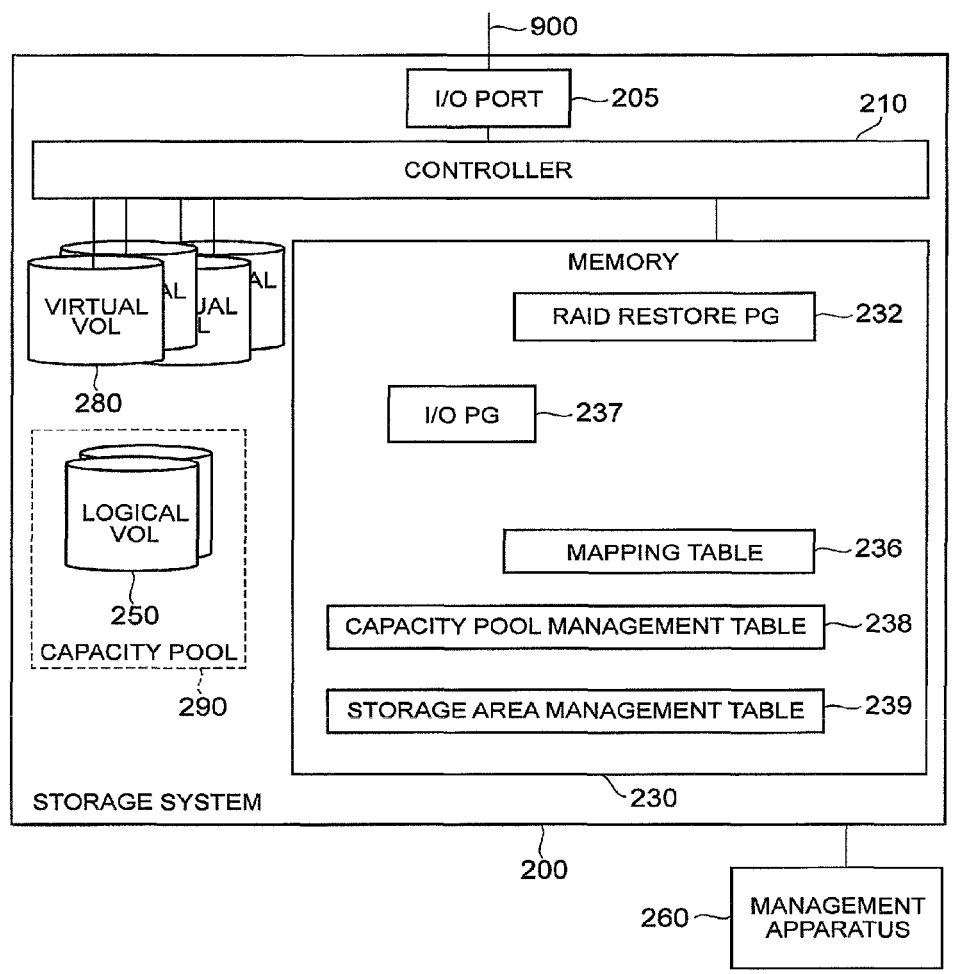
FIG. 4 shows programs and data of the storage system 200 of the first embodiment.

FIG. 4 shows the programs and data of the storage system 200 of the first embodiment.

In addition to the above-mentioned I/O program 237, the memory 230 stores a RAID restore program 232, mapping table 236, capacity pool management table 238, and storage area management table 239.

FIG. 5 shows an example of the constitution of the mapping table 236 of the first embodiment.

A mapping table 236 is prepared for each virtual volume 280. Thus, in the explanation of FIG. 5 below, the virtual volume 280, which corresponds to the mapping table 236 shown in the figure, will be referred to as the "relevant virtual volume 280". The plurality of records (rows) constituting the mapping table 236 shown in the figure respectively corresponds to the plurality of virtual chunks constituting the relevant virtual volume 280. That is, a record corresponds one-to-one with a virtual chunk.

A logical volume ID and a LBA (logical block address) are recorded in one record. The LBA denotes the location of the real chunk. That is, a real chunk in the capacity pool 290 can be specified using an identifier of a logical volume 250 comprised in the capacity pool 290 (the logical volume ID), and a logical block address (LBA) showing the location of the real chunk inside the relevant logical volume 250.

Furthermore, if there is an invalid value (for example, NULL) entry for the logical volume ID, this signifies that a real chunk has yet to be allocated to the virtual chunk corresponding to this record.

For example, the mapping table 236 shown in the figure is for managing a virtual volume 280 comprising four virtual chunks. According to this table 236, it is clear that real chunks have yet to be allocated to the first virtual chunk and the fourth virtual chunk. Further, it is clear that a real chunk corresponding to LBA "0x10001000" in the logical volume 250 specified by the logical volume ID "#0001" has been allocated to the second virtual chunk. Furthermore, it is clear that a real chunk corresponding to LBA "0x12345678" in the logical volume 250 specified by the logical volume ID "# FFBA" has been allocated to the third virtual chunk. Furthermore, "0x" is a prefix expressing a hexadecimal.

FIG. 6 shows an example of the constitution of a capacity pool management table 238 of the first embodiment.

A capacity pool management table 238 is prepared for each capacity pool 290. Therefore, in the explanation of FIG. 6 that follows, the capacity pool 290 corresponding to the capacity pool management table 238 shown in the figure will be referred to as the "relevant capacity pool 290". The plurality of records (rows) constituting the capacity pool management table 238 shown in the figure respectively corresponds to the plurality of logical volumes 250 constituting the relevant capacity pool 290. That is, the records correspond one-to-one with the logical volumes 250.

A logical volume ID and a pointer to the storage area management table 239 are recorded in one record. According to the capacity pool management table 238 shown in the figure, it is clear that the relevant capacity pool 290 is constituted by three logical volumes 250. Further, it is clear that the storage area management table 239, which manages the chunk of the logical volume 250 specified by the logical volume ID #0001" resides at memory 230 address "0xAB8FFF00". It is clear that the storage area management table 239, which manages the chunk of the logical volume 250 specified by the logical volume ID "# FFBA" resides at memory 230 address "0x00115800". It is clear that the storage area management table 239, which manages the chunk of the logical volume 250 specified by the logical volume ID "#0020" resides at memory 230 address "0x808F2240".

FIG. 7 shows an example of the constitution of the storage area management table 239 of the first embodiment.

A storage area management table 239 is prepared for each logical volume 250 comprised in the capacity pool 290. Therefore, in the explanation of FIG. 7 that follows, the logical volume 250 corresponding to the storage area management table 239 shown in the figure will be referred to as the "relevant logical volume 250". The plurality of records (rows) constituting the storage area management table 239 shown in the figure respectively corresponds to the plurality of real chunks constituting the relevant logical volume 250. That is, the records correspond one-to-one with the real chunks.

A virtual volume 280 identifier (a virtual volume ID) and an address (LBA) showing the location of a virtual chunk are recorded in one record. That is, it is clear from the virtual volume ID and LBA recorded in a record that the real chunk corresponding to this record is mapped to a certain virtual chunk in a certain virtual volume 280. Furthermore, an invalid value (for example, NULL) entry for the virtual volume ID shows that the real chunk corresponding to this record has yet to be allocated to the virtual volume 280.

For example, the storage area management table 239 shown in the figure is an example of a storage area management table 239 for managing a logical volume 250 comprising four real chunks. According to this table 239, the first, second and fourth real chunks have yet to be allocated to the virtual volume 280. Further, the third real chunk has been allocated to the virtual chunk specified by LBA "0x00001000" of the virtual volume 280 specified by the virtual volume ID "#8001".

When a real chunk is allocated to a virtual chunk, the I/O program 237 records the logical volume ID and LBA corresponding to the allocated real chunk in the record corresponding to this virtual chunk in the mapping table 236, which corresponds to the virtual volume 280 having this virtual chunk. Further, the I/O program 237 records the virtual volume ID and LBA corresponding to the allocation-destination virtual chunk in the record corresponding to this real chunk in the storage area management table 239, which corresponds to the logical volume 250 having the allocated real chunk.

Figure 8:
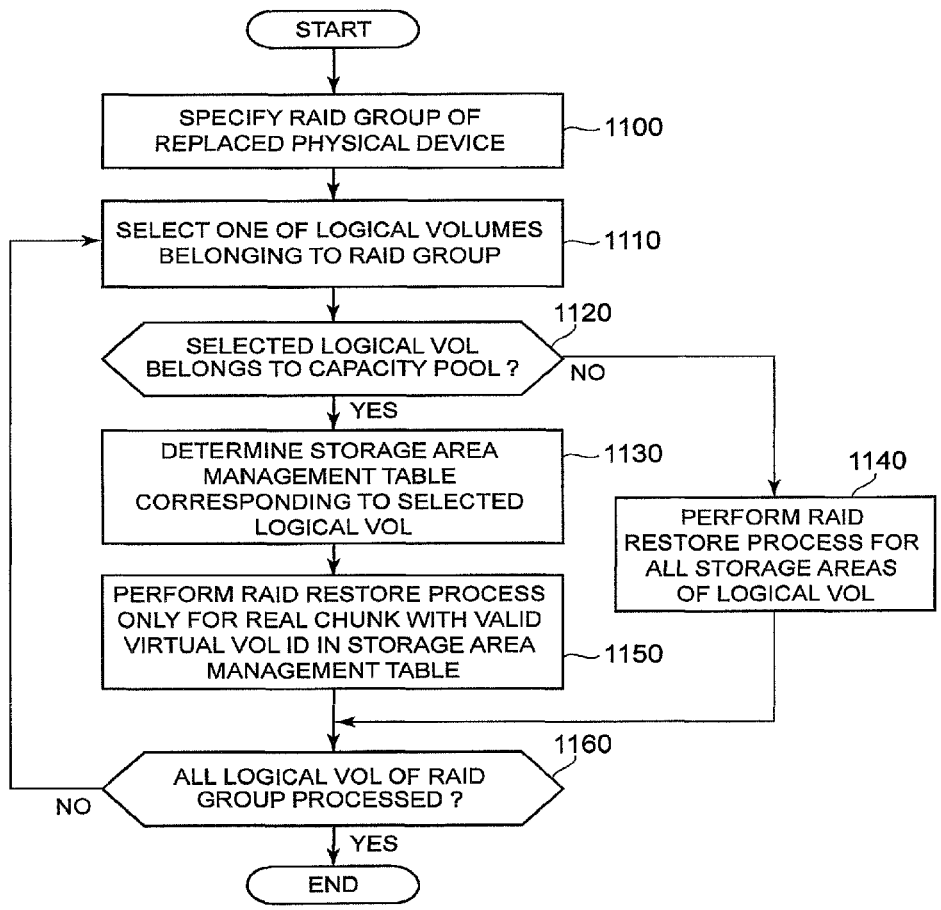
FIG. 8 is a flowchart of a RAID restore process of the first embodiment.

FIG. 8 is a flowchart of the RAID restore process in the first embodiment.

The RAID restore program 232 is the program executed by the controller 210 when a failed physical device 240 is replaced, or when the failure of a physical device 240 is detected and the storage system 200 begins using a reserved physical device 240 in accordance with a hot swap (for example, when a reserved physical device 240 is made a member of the RAID group 270 in place of a failed physical device 240). Hereinafter, processing attributed to a computer program is in actuality processing that is being carried out by the controller (for example, the processor) executing this computer program.

First, the RAID restore program 232 specifies the RAID group 270 to which the replaced physical device 240 belongs (Step 1100). The specified RAID group 270, for example, is the RAID group 270 to which the failed physical device 240 originally belonged.

Next, the RAID restore program 232 selects one logical volume 250 for which the RAID restore process has not been completed, from among the logical volumes 250 belonging to the specified RAID group 270 (Step 1110).

Next, the RAID restore program 232 checks whether or not the selected logical volume 250 belongs to any of the capacity pools 290 (Step 1120). More specifically, for example, the RAID restore program 232 searches all the capacity pool management tables 238 residing in the memory 230. As a result, when there exists a capacity pool management table 238, which has a record in which a logical volume 250 equivalent to the logical volume ID of the selected logical volume 250 is recorded, the RAID restore program 232 determines that the selected logical volume 250 belongs to the capacity pool 290. Conversely, when a capacity pool management table 238, which has a record in which a logical volume 250 equivalent to the logical volume ID of the selected logical volume 250 is recorded, does not exist, the RAID restore program 232 determines that the selected logical volume 250 does not belong to the capacity pool 290.

When it is determined in Step 1120 that the selected logical volume 250 does not belong to the capacity pool 290, processing moves to Step 1140. That is, the RAID restore program 232 carries out a RAID restore process for the storage area of the RAID group 270, which was allocated to the selected logical volume 250.

In Step 1140, if the RAID restore program is executed for the entire storage area allocated to the selected logical volume 250, processing jumps to Step 1160.

Conversely, when it is determined in Step 1120 that the selected logical volume 250 belongs to the capacity pool 290, processing proceeds to Step 1130. The RAID restore program 232 specifies the storage area management table 239 corresponding to the selected logical volume 250. In accordance with the search conducted in Step 1120, a capacity pool management table 238 record, in which is recorded a logical volume ID equivalent to the logical volume ID of the selected logical volume 250, is found. Thus, the storage area management table 239 can be easily specified by pointing the storage area management table 239 corresponding to the selected logical volume 250 to the storage area management table 239 of the found record.

Next, the RAID restore program 232 scans the records of the determined storage area management table 239 in order from the top, and carries out a RAID restore process for the respective real chunks corresponding to the records in which valid virtual volume ID values are recorded (Step 1150). That is, since real chunks corresponding to the records in which valid virtual volume ID values are recorded have already been allocated to the virtual volume 280, these real chunks hold data written by the host computer 100. Thus, it is necessary to use the RAID restore process to restore these real chunks from low states of reliability to high states of reliability. Conversely, real chunks corresponding to the records that do not show valid virtual volume ID values have yet to be allocated to the virtual volume 280, and do not hold data written by the host computer 100. Thus, it is not necessary to execute the RAID restore process. According to the above description, there is no need to restore data to a logical storage area (for example, either parts or all of either one or a plurality of logical volumes) corresponding to a failed physical device. In truth, the RAID restore process can be executed only for the necessary part (that is, only for the part of the storage area equivalent to the real chunk, which has been allocated to the virtual chunk). Consequently, the RAID restore process can be completed in a shorter period of time overall.

If all of the records of the specified storage area management table 239 are scanned in Step 1150 (in other words, if all the real chunks of the selected logical volume 250 are processed), processing proceeds to Step 1160.

In Step 1160, the RAID restore program 232 checks whether or not all the logical volumes 250 belonging to the RAID group 270 have been processed. If there are still logical volumes 250 that have not been processed, processing returns to Step 1110, and the same processing is carried out for the remaining logical volumes 250.

The above-mentioned series of processes continues until all the logical volumes 250 have been processed, and when processing has been completed for all the logical volumes 250, execution of the RAID restore program 232 ends.

As described above, in a storage system 200 having a dynamic capacity allocation function, carrying out the RAID restore process only for the real chunks allocated to the virtual volume 280 makes it possible to rapidly complete the RAID restore processing required when a physical device 240 has failed. In other words, when reliability is lowered by the fact that a physical device 240 has failed, the lowered state of reliability can be restored to a high state of reliability in a short time.

For example, when the RAID group 270 to which a selected logical volume 250 belongs is constituted in accordance with RAID 1, first of all, the RAID restore program 232 can determine the first storage area of the failed first physical device 240, which corresponds to the allocated real chunk in this logical volume 250 (the real chunk allocated to the virtual area). Next, the RAID restore program 232 can copy data, from among a data group of the remaining second logical device 240 stored in the second storage area in the same location as the determined first storage area in the replaced physical device 240, to a storage area in the same location as the first and second storage areas in the replaced physical device 240. Consequently, a redundant state is restored. Further, the data copied here is solely data stored in the physical device 240 storage area, which corresponds to the real chunk allocated to the virtual chunk. Thus, the RAID processing can be carried out quickly.

Furthermore, the above-mentioned first storage area and the above-mentioned second storage area correspond to the same real chunk. Thus, subsequent to the RAID restore process, there is no need to change the real chunk, which is allocated to the virtual chunk. This is not limited to RAID 1, but rather is the same for other RAID levels as well.

Embodiment 2

A second embodiment of the present invention will be explained below. In so doing, primarily the differences with the first embodiment will be explained; explanations of points in common with the first embodiment will be simplified or omitted.

Figure 9:
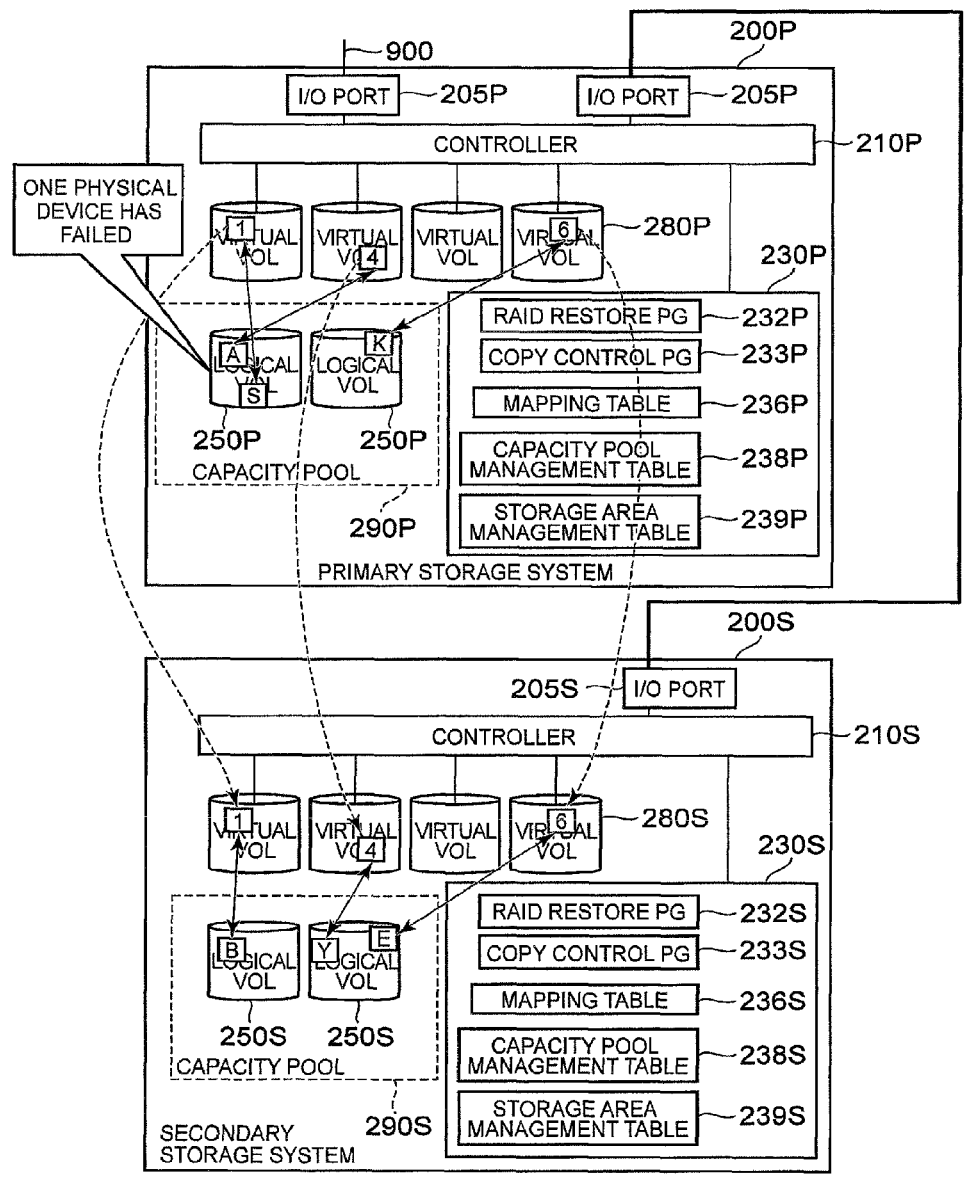
FIG. 9 shows an example of the constitution of a remote copy system related to a second embodiment of the present invention.

FIG. 9 shows an example of the constitution of a remote copy system related to the second embodiment of the present invention. Furthermore, in FIG. 9 (and FIGS. 11 and 12 explained hereinbelow), the figure of the I/O program 237 will be omitted to conserve paper.

Storage systems, which have the function explained in the first embodiment, for example, are connected via I/O ports. Hereinafter, the one storage system 200 will be referred to as the "primary storage system 200P", and the other storage system 200 will be referred to as the "secondary storage system 200S". Further, to make it easier to know which storage system components are being described, in the following explanation, the letter "P" will be appended to the parent numerals (for example, 210, 230, and so forth) for elements of the primary storage system 200P. By contrast, the letter "S" will be appended to the parent numerals (for example, 210, 230, and so forth) for elements of the secondary storage system 200S.

The memory 230P (the memory 230S) of the primary storage system 200P (and the secondary storage system 200S) also stores a copy control program 233P (233S) for executing a remote copy.

In this embodiment, a synchronous remote copy is carried out by the copy control programs 233P and 233S. A synchronous remote copy is a copy in which, when the one logical volume (primary volume) constituting a copy-pair is updated, the other logical volume (secondary volume) constituting the copy-pair is also updated in synch with this update, thereby ensuring that the contents of both volumes are the same at all times. This is the same when a copy-pair has been created for virtual volumes 280P and 280S. When the primary storage system 200P receives a write request from the host computer 100, a synchronous remote copy is carried out. A synchronous remote copy differs from an asynchronous remote copy in that, when the primary storage system 200P receives a notification from the secondary storage system 200S to the effect that the data has been written to the secondary volume, the primary storage system 200P notifies the host computer 100 of write-end (the write conforming to the received write request has been completed).

When a synchronous remote copy is carried out between the virtual volumes 280P, 280S, the copy-source storage area of virtual volume 280P and the copy-target storage area of virtual volume 280S are in the same locations of the respective virtual volumes 280P, 280S. More specifically, for example, as shown in FIG. 9, if the copy-source in virtual volume 280P is virtual chunk "1" at the top of virtual volume 280P, the copy-target of virtual volume 280S will be virtual chunk "1" at the top of virtual volume 280S.

When a synchronous remote copy is carried out between the virtual volumes 280P, 280S in this way, the copy-source and copy-target will be virtual chunks located in the same locations respectively, but the allocated real chunks need not be in the same locations. For example, as shown in FIG. 9, real chunk "S" of the first logical volume 250P of the capacity pool 290P is allocated to virtual chunk "1" of the copy-source, but a real chunk, which is located in a completely different location than real chunk "S", for example, real chunk "B" of the second logical volume 250S of the capacity pool 290S, is allocated to virtual chunk "1" of the copy-target.

In brief, in the primary storage system 200P and secondary storage system 200S, the copy-source and copy-target virtual chunks are in the same locations in the copy-source virtual volume 280P and the copy-target virtual volume 280S, but this relationship is not necessarily the same for the real chunks allocated to these virtual chunks.

FIG. 10 shows an example of the constitution of the mapping table 236P.

A virtual chunk type is also configured in the respective records of the mapping table 236P. Virtual chunk type denotes whether or not the virtual chunk corresponding to a record is a low-reliability virtual chunk, which will be explained hereinbelow. More specifically, if the value of the virtual chunk type is "1", this denotes that the virtual chunk is highly reliable. More specifically, for example, virtual chunk type "1" denotes that reliability has not dropped as a result of the failure of the physical device, or that reliability has been restored to a high state by completing a below-described virtual chunk restore process for a virtual chunk that had been reduced to low reliability. If the virtual chunk type value is "0", this denotes that the reliability of the virtual chunk has been lowered. More specifically, for example, chunk type value "0" denotes that a virtual chunk restore process is in progress.

When an I/O request is received from the host computer 100 during a RAID restore process, this virtual chunk type is used to determine where to set the access destination, more specifically, to determine with regard to the primary virtual chunk specified by this I/O request whether to access the real chunk inside the primary storage system 200P, or to access the real chunk, which has been allocated to the secondary virtual chunk corresponding to this primary virtual chunk.

The flow of processing carried out by the second embodiment will be explained below.

Figure 11:
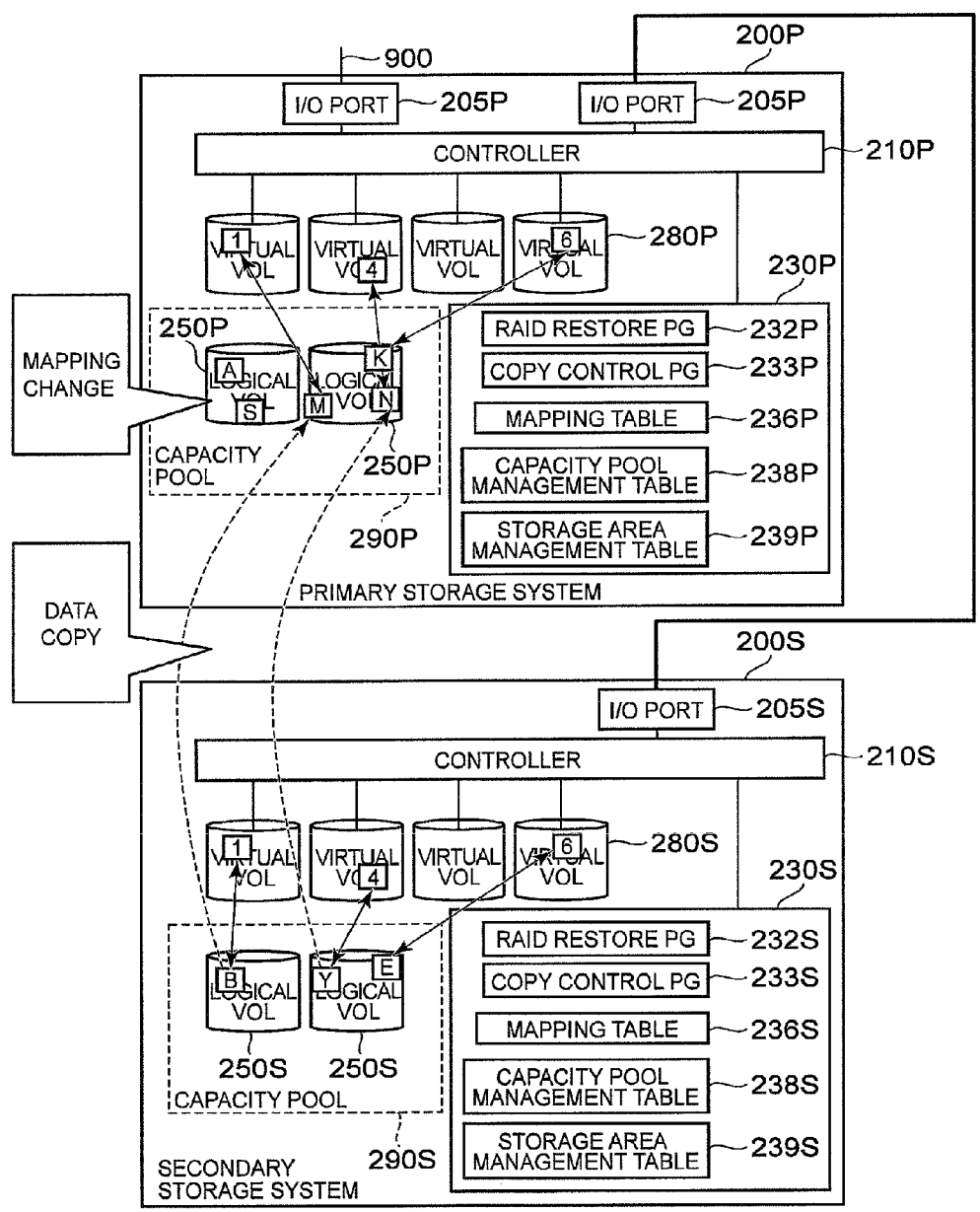
FIG. 11 is a schematic diagram of the RAID restore process of the second embodiment.
Figure 12:
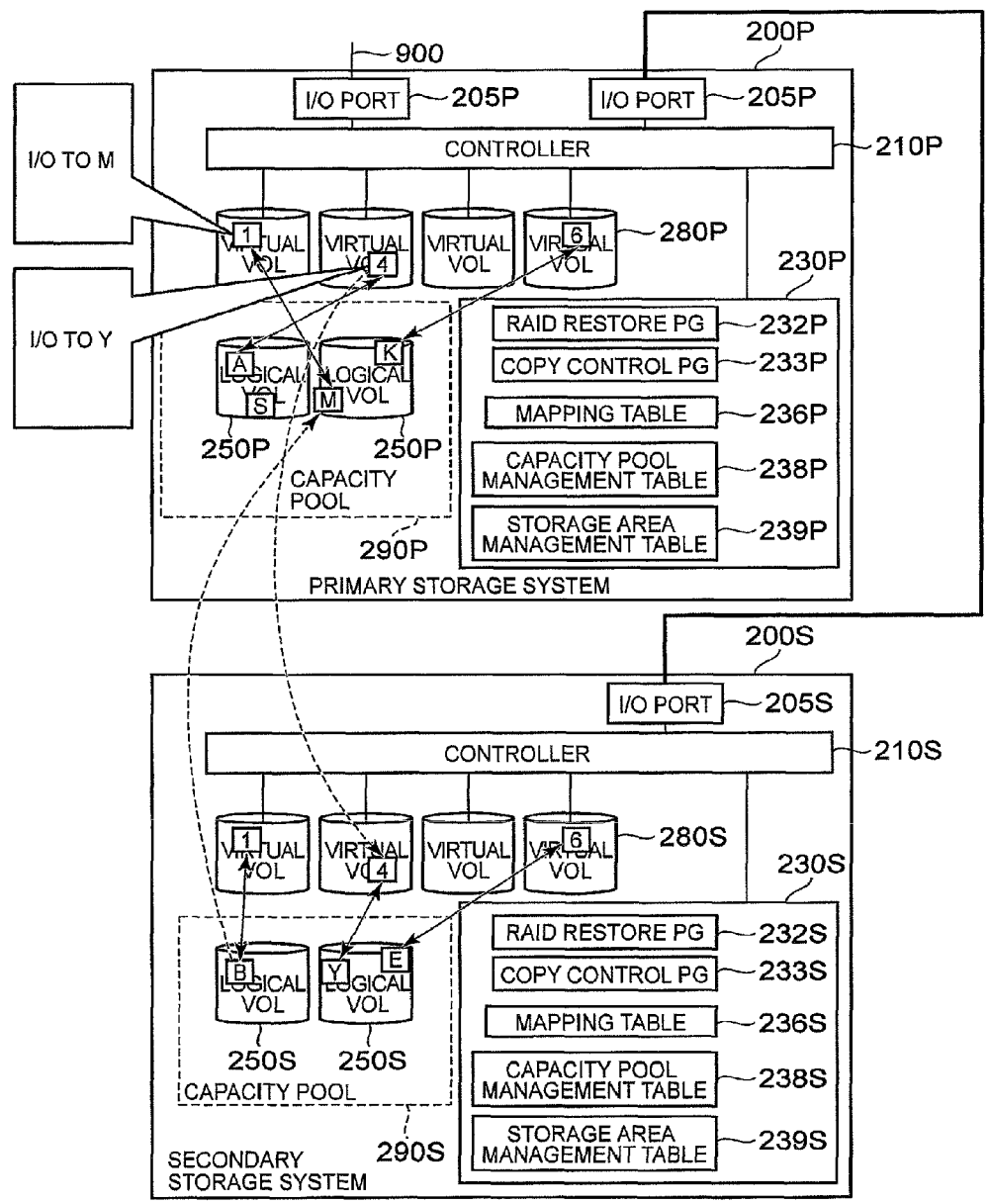
FIG. 12 is a schematic diagram of I/O control during the RAID restore process of the second embodiment.

For example, in FIG. 9, when the failure occurs in the physical device, a RAID restore process is executed as shown in FIG. 11.

More specifically, for example, first the RAID restore program 232P references the storage area management table 239 corresponding to the logical volume 250P in the RAID group 270P to which this failed physical device belongs, and specifies which real chunk of the plurality of real chunks constituting this logical volume 250P has been allocated to which virtual chunk in which virtual volume 280P. The virtual chunk restore process is carried out for each specified virtual chunk, that is, for each low-reliability virtual chunk. A "low-reliability virtual chunk" is a virtual chunk to which has been allocated a real chunk of a logical volume 250P for which reliability has been lowered due to the failure of a physical device (low-reliability real chunk). From the examples given in FIGS. 9 and 11, primary virtual chunks "1" and "4" are low-reliability virtual chunks to which low-reliability real chunks "S" and "A" have respectively been allocated, and virtual chunk "6" is a high-reliability virtual chunk to which real chunk "K" of the logical volume 250, which is not suffering from low reliability, has been allocated. The "virtual chunk restore process" is the process by which restoring data from a secondary virtual chunk to a primary virtual chunk (low-reliability virtual chunk) changes the real chunk allocated to this primary virtual chunk from a real chunk, which is in the low-reliability virtual volume 250P, to a real chunk, which is in a high-reliability logical volume 250P.

More specifically, for example, in the primary storage system 200P, the RAID restore program 232P changes the virtual chunk type (the virtual chunk type in the record corresponding to this virtual chunk in the mapping table 236P) corresponding to the specified virtual chunk (for example, virtual chunk "1") from "0" (a low-reliability virtual chunk) to "1" (not a low-reliability virtual chunk). The RAID restore program 232P notifies the copy control program 233P of the virtual volume ID of the specified primary virtual volume 280P, and the LBA of the specified virtual chunk. The copy control program 233P sends a copy-back request, which specifies the notified primary virtual volume ID and LBA, to the copy control program 233S of the secondary storage system 200S.

In the secondary storage system 200S, the copy control program 233S receives this copy-back request. The copy control program 233S specifies the secondary virtual volume ID corresponding to the primary virtual volume ID specified in this copy-back request, for example, by referencing a copy management table (a table denoting which volumes constitute pairs), which is not shown in the figure. Then, the copy control program 233S specifies the real chunk (for example, real chunk "B"), which has been allocated to the virtual chunk (for example, secondary virtual chunk "1") corresponding to the specified secondary virtual volume ID and LBA specified in the copy-back request, reads data from the specified real chunk, and sends this data, together with the secondary virtual volume ID and LBA to the copy control program 233P of the primary storage system 200P.

In the primary storage system 200P, the copy control program 233P receives the data and the secondary virtual volume ID and LBA. The copy control program 233P specifies the primary virtual volume ID corresponding to this secondary virtual volume ID, for example, by referencing a copy management table (a table denoting which volumes constitute pairs), which is not shown in the figure. The copy control program 233P references the mapping table 236P corresponding to the specified primary virtual volume ID, and changes the logical volume ID and LBA of the real chunk, which has been allocated to the virtual chunk (for example, primary virtual chunk "1") corresponding to the above-mentioned received LBA to a different logical volume ID and LBA, which has not been allocated to any virtual chunk. That is, the existing allocation of the real chunk (for example, real chunk "S") corresponding the virtual chunk (for example, primary virtual chunk "1"), which corresponds to the above-mentioned received LBA, is deleted, and the real chunk (for example, real chunk "M") of the logical volume 250P, which differs from the logical volume 250P of this real chunk, is allocated to this virtual chunk. This different logical volume 250P is the logical volume 250P, which belongs to the RAID group 270P, in which there are no physical device failures and a high state of reliability is maintained. In other words, the real chunk allocated to the virtual chunk for which a real chunk allocation was deleted, is in a logical volume 250P, which belongs to a RAID group 270P that is different from the RAID group 270P to which the low-reliability logical volume 250P belongs.

The above-described virtual chunk restore process is carried out for each low-reliability virtual chunk in the primary virtual volume 280P. The virtual chunk type (the virtual chunk type in the record corresponding to this virtual chunk in the mapping table 233P), which corresponds to the virtual chunk for which the virtual chunk restore process has been completed, is updated from "0" (a low-reliability virtual chunk) to "1" (not a low-reliability virtual chunk) by the copy control program 233P.

When virtual chunk restore processing has been completed for all low-reliability virtual chunks, the RAID restore process comes to an end. In other words, the RAID restore process is a collection of virtual chunk restore processes.

In this embodiment, even when a RAID restore process is in progress, the primary storage system 200P accepts from the host computer 100 a read request specifying a primary virtual volume, which is in the midst of a virtual chunk restore process. The virtual chunk specified by this read request can be a low-reliability virtual chunk.

In this case, the controller 210P (more specifically, for example, the I/O program 237, which processes the read request from the host) references the virtual chunk type corresponding to the virtual chunk specified by the received read request (hereinafter, the specified primary virtual chunk).

If the referenced virtual chunk type is "0", the controller 210P reads the data from the real chunk inside the primary storage system 200P allocated to the specified primary virtual chunk, and sends this data to the host computer 100 as usual. This is because the specified primary virtual chunk is not a low-reliability virtual chunk.

If the referenced virtual chunk type is "1", the controller 210P reads data from the real chunk in the secondary storage system 200S allocated to the secondary virtual chunk corresponding to the specified primary virtual chunk. This is because the specified primary virtual chunk is a low-reliability virtual chunk (a virtual chunk in the midst of virtual chunk restore processing).

More specifically, the controller 210P sends the virtual volume ID of the secondary virtual volume 280S corresponding to the primary virtual volume 280P, which has the specified primary virtual chunk, and the read request, which specified the LBA of the above-mentioned corresponding secondary virtual chunk, to the secondary storage system 200S. Accordingly, in the secondary storage system 200S, the I/O program 237S (not shown in the figure), which is executed by the controller 210S, receives this read request, reads data from the real area corresponding to the secondary virtual chunk specified in this read request, and sends this data to the primary storage system 200P. In the primary storage system 200P, the controller 210P (the I/O program 237P not shown in the figure) sends this data to the host computer 100.

According to the above-described second embodiment, the RAID restore process is carried out only for a low-reliability virtual chunk. Consequently, a state of low reliability can be quickly restored to a high-reliability state even in a synchronous remote copy. Further, when the communication band of the remote copy is large, the RAID restore process in the second embodiment can be faster than the RAID restore process in the first embodiment. Furthermore, for instance, when a structure such as RAID 4 and 5 is adopted in the primary storage system 200P, the RAID restore process in the second embodiment can be faster than the RAID restore process in the first embodiment because data stored in the physical device where a fault has occurred is restored based on data stored in another physical device in the RAID group including the physical device (physical device where no fault has occurred).

A number of embodiments of the present invention have been explained hereinabove, but these are examples for explaining the present invention, and do not purport to limit the scope of the present invention solely to this embodiments. The present invention can be put into practice is a variety of other modes.

What is claimed is:

1. A storage system comprising:
a controller; and,
a plurality of physical storage devices coupled to the controller and constituting a RAID group;
wherein the controller provides one or more logical volumes belonging to the RAID group, each of the one or more logical volumes having a plurality of storage areas; and
one or more virtual volumes,
wherein, when receiving a write request to a virtual volume of the one or more virtual volumes, the controller is configured to:
allocate a storage area in a logical volume to the virtual volume, as an allocated storage area, where reliability of the storage area is used as a criterion in a selection of the storage area for allocation to the virtual volume; and
write data to the allocated storage area,
wherein, the controller is configured to selectively perform a RAID allocation process to a storage area allocated to a virtual volume.

2. A storage system according to claim 1,
wherein the controller is configured, regarding the reliability used as a criterion in the selection, to select, for the logical volume, a volume existing in a second RAID group which is different from a first RAID group to which a failed logical volume belongs.

3. The storage system according to claim 1, wherein, when a physical storage device of the plurality of physical storage devices fails, the controller is configured to selectively perform a RAID restore process to the storage area allocated to the virtual volume.

4. A storage method effected in a storage system which includes:
a controller; and,
a plurality of physical storage devices coupled to the controller and constituting a RAID group;
wherein the controller provides one or more logical volumes belonging to the RAID group, each of the one or more logical volumes having a plurality of storage areas; and
one or more virtual volumes,
the storage method comprising:
wherein, when receiving a write request to a virtual volume of the one or more virtual volumes, the controller:
allocates a storage area in a logical volume to the virtual volume, as an allocated storage area, where reliability of the storage area is used as a criterion in a selection of the storage area for allocation to the virtual volume; and writes data to the allocated storage area, wherein, the controller selectively performs a RAID allocation process to a storage area allocated to a virtual volume.

5. A storage method according to claim 4, wherein, regarding the reliability used as a criterion in the selection, the controller selects, for the logical volume, a volume existing in a second RAID group which is different from a first RAID group to which a failed logical volume belongs.

6. A storage method according to claim 4, wherein, when a physical storage device of the plurality of physical storage devices fails, the controller selectively performs a RAID restore process to the storage area allocated to the virtual volume.

* * * * *